US012432075B2

(12) United States Patent
Cate et al.

(10) Patent No.: US 12,432,075 B2
(45) Date of Patent: Sep. 30, 2025

(54) BLOCKCHAIN SECURITY FOR DISTRIBUTED MULTI-CLOUD ORCHESTRATION AND CONFIGURATION MANAGEMENT

(71) Applicant: Dell Products, L.P., Round Rock, TX (US)

(72) Inventors: Bridget Cate, Taylors, SC (US); Ching-Yun Chao, Austin, TX (US); Elie Antoun Jreij, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 18/150,568

(22) Filed: Jan. 5, 2023

(65) Prior Publication Data
US 2024/0235852 A1 Jul. 11, 2024

(51) Int. Cl.
*H04L 9/32* (2006.01)
*H04L 9/14* (2006.01)

(52) U.S. Cl.
CPC .............. *H04L 9/3268* (2013.01); *H04L 9/14* (2013.01)

(58) Field of Classification Search
CPC ....... H04L 9/3268; H04L 9/14; H04L 9/3239; H04L 9/3247; H04L 9/3255; H04L 9/50
See application file for complete search history.

(56) References Cited

U.S. PATENT DOCUMENTS 10,986,079 B2 * 4/2021 Kursun ................... H04L 63/08
11,263,232 B2 * 3/2022 Kaji ....................... H04L 9/3239
(Continued)

FOREIGN PATENT DOCUMENTS

WO WO-2022072626 A1 * 4/2022 ......... G06F 16/1837

OTHER PUBLICATIONS

Paverd, A., Tamrakar, S., Nguyen, H. L., Pendyala, P. K., Nguyen, T. D., Stobert, E., . . . & Sadeghi, A. R. (2015). OmniShare: securely accessing encrypted cloud storage from multiple authorized devices. arXiv preprint arXiv:1511.02119. (Year: 2015).*

(Continued)

*Primary Examiner* — Carl G Colin
*Assistant Examiner* — Phillip Emmanuel Wilson
(74) *Attorney, Agent, or Firm* — Amin, Turocy & Watson, LLP

(57) ABSTRACT

Blockchain security for distributed multi-cloud orchestration and configuration management is described herein. A method as described herein can include receiving, by a system comprising a processor from a first computing device, an admission request for entry of the first computing device into a blockchain system, the admission request comprising hardware verification data relating to a hardware configuration of the first computing device, wherein the admission request is signed by a private key associated with the first computing device; facilitating, by the system, validation of the hardware verification data by respective second computing devices in the blockchain system, the validation being based on a public key stored in a public key certificate associated with the first computing device; and granting, by the system, admission of the first computing device into the blockchain system in response to a supermajority of the second computing devices successfully validating the hardware verification data.

20 Claims, 16 Drawing Sheets

(56) References Cited

U.S. PATENT DOCUMENTS

| | | | |
|---|---|---|---|
| 11,270,306 B2* | 3/2022 | Yan | H04L 9/14 |
| 11,283,623 B1* | 3/2022 | Griffin | H04L 9/3268 |
| 11,405,189 B1* | 8/2022 | Bennison | H04L 63/0807 |
| 11,416,620 B1* | 8/2022 | Paczkowski | H04L 9/3236 |
| 11,838,406 B2* | 12/2023 | Krishnaswamy | G06F 16/137 |
| 11,930,113 B2* | 3/2024 | Zeng | H04L 9/3247 |
| 2018/0101560 A1* | 4/2018 | Christidis | H04L 9/3236 |
| 2018/0121909 A1* | 5/2018 | Christidis | H04L 9/3236 |
| 2018/0328612 A1* | 11/2018 | Sinha | F24F 11/30 |
| 2018/0337882 A1* | 11/2018 | Li | G06Q 20/3825 |
| 2018/0365633 A1* | 12/2018 | Hanis | G06F 16/955 |
| 2019/0036895 A1* | 1/2019 | Irvine | H04L 9/3239 |
| 2019/0116185 A1* | 4/2019 | Nagai | H04L 67/54 |
| 2019/0251563 A1* | 8/2019 | Yan | H04L 9/14 |
| 2019/0266145 A1* | 8/2019 | Qiu | G06Q 20/02 |
| 2019/0317924 A1* | 10/2019 | Alimi | H04L 9/3263 |
| 2020/0059369 A1* | 2/2020 | Li | H04L 9/0643 |
| 2020/0201846 A1* | 6/2020 | Yang | H04L 9/3239 |
| 2020/0213128 A1* | 7/2020 | Sharma | H04L 9/3226 |
| 2020/0394651 A1* | 12/2020 | Kreder, III | G06Q 20/22 |
| 2021/0014042 A1* | 1/2021 | Sivathanu | H04L 9/0637 |
| 2021/0044976 A1* | 2/2021 | Avetisov | H04W 12/08 |
| 2021/0083882 A1* | 3/2021 | Venable, Sr. | H04L 9/3268 |
| 2021/0203661 A1* | 7/2021 | Sankey | G06F 16/27 |
| 2021/0258154 A1* | 8/2021 | Park | G06F 16/9024 |
| 2021/0273812 A1* | 9/2021 | Hardin | H04L 9/0637 |
| 2022/0012672 A1* | 1/2022 | Inman | G06Q 10/1053 |
| 2022/0286274 A1* | 9/2022 | Mondello | G06F 3/0679 |
| 2022/0376897 A1* | 11/2022 | MacKay | H04L 9/3236 |
| 2023/0123236 A1* | 4/2023 | Kuebler | G06Q 10/06393 705/7.11 |
| 2023/0195750 A1* | 6/2023 | Abraham | G06F 11/1451 707/613 |
| 2023/0196346 A1* | 6/2023 | Higgins | G06Q 20/3827 705/64 |
| 2023/0252461 A1* | 8/2023 | Oh | G06Q 20/02 705/75 |
| 2023/0334485 A1* | 10/2023 | Nagai | H04L 67/1097 |

OTHER PUBLICATIONS

"Fido Device Onboard Specification 1.1," Fido Alliance, https://fidoalliance.org/specs/FDO/FIDO-Device-Onboard-RD-v1.1-20211214, 2021, 114 pages.

"An Overview of Hyperledger Foundation," https://www.hyperledger.org/wp-content/uploads/2021/11/HL_Paper_HyperledgerOverview_102721.pdf, Oct. 2021, 10 pages.

Pease et al., "Reaching Agreement in the Presence of Faults," Journal of the Association for Computing Machinery, vol. 27, No. 2, Apr. 1980, pp. 228-234, 7 pages.

"The Raft Consensus Algorithm," https://raft.github.io/, accessed Oct. 31, 2022, 18 pages.

"Proof-of-Stake (POS)," https://ethereum.org/en/developers/docs/consensus-mechanisms/pos/, accessed Oct. 31, 2022, 3 pages.

* cited by examiner

BLOCKCHAIN SECURITY FOR DISTRIBUTED MULTI-CLOUD ORCHESTRATION AND CONFIGURATION MANAGEMENT

BACKGROUND

A blockchain cryptographically links transaction records of a public ledger together, record block by record block, to render the records functionally immutable. Blockchains are used in a wide variety of applications, such as those relating to finance, healthcare, logistics, etc. Management of a general purpose blockchain can be associated with high computational requirements, e.g., associated with validating the consistency of cryptographically linked transaction records on an ongoing basis. Additionally, because a blockchain is a distributed structure, it can be vulnerable to malicious actors seeking to manipulate the blockchain for their own ends.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include a memory that stores executable components and a processor that executes the executable components stored in the memory. The executable components can include a request processing component that receives a request for admission of a device into a blockchain group, associated with the system and including member devices. The request can include hardware attestation data indicative of a hardware configuration of the device and can be signed by a device private key associated with the device. The executable components can further include a hardware validation component that facilitates verification, by the member devices of the blockchain group, of the hardware attestation data based on a public key stored in a public key certificate associated with the device. The executable components can also include a membership management component that admits the device into the blockchain group in response to a supermajority of the member devices successfully validating the hardware attestation data.

In another implementation, a method is described herein. The method can include receiving, by a system including a processor from a first computing device, an admission request for entry of the first computing device into a blockchain system. The admission request can include hardware verification data relating to a hardware configuration of the first computing device, and the admission request can be signed by a private key associated with the first computing device. The method can also include facilitating, by the system, validation of the hardware verification data by respective second computing devices in the blockchain system, the validation being based on a public key stored in a public key certificate associated with the first computing device. The method can additionally include granting, by the system, admission of the first computing device into the blockchain system in response to a supermajority of the second computing devices successfully validating the hardware verification data.

In an additional implementation, a non-transitory machine-readable medium including computer executable instructions is described herein. The instructions, when executed by a processor, can facilitate performance of operations including facilitating verification, by first devices belonging to a blockchain computing group, of hardware configuration data associated with a second device requesting to join the blockchain computing group, where the hardware configuration data is provided by the second device in a request, signed by a private key associated with the second device; and admitting the second device into the blockchain computing group in response to a supermajority of the first devices successfully validating the hardware configuration data.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various implementations described herein facilitate an efficient, secure blockchain, e.g., for multi-cloud orchestration, configuration management, and other uses. While, as noted above, blockchain technology is widely used in a variety of fields, higher computation requirements and slower transaction performance make blockchain technology less practical for distrusted orchestration and configuration management purposes, e.g., as compared to traditional relational database transactions. Various implementations described herein can be used to increase computational efficiency associated with applying blockchain technology to device orchestration and configuration management, such as computational requirements associated with validating consistency of cryptographically linked transaction records, e.g., to guard against double spending. Traditional techniques for validating transaction record consistency are difficult for average Internet of Things (IoT) devices and a less than desirable use of computing power for enterprise management servers. In contrast, various implementations described herein can facilitate increased blockchain performance with reduced cost, which can in turn enable the use of blockchain for distributed management applications.

Figure 1:
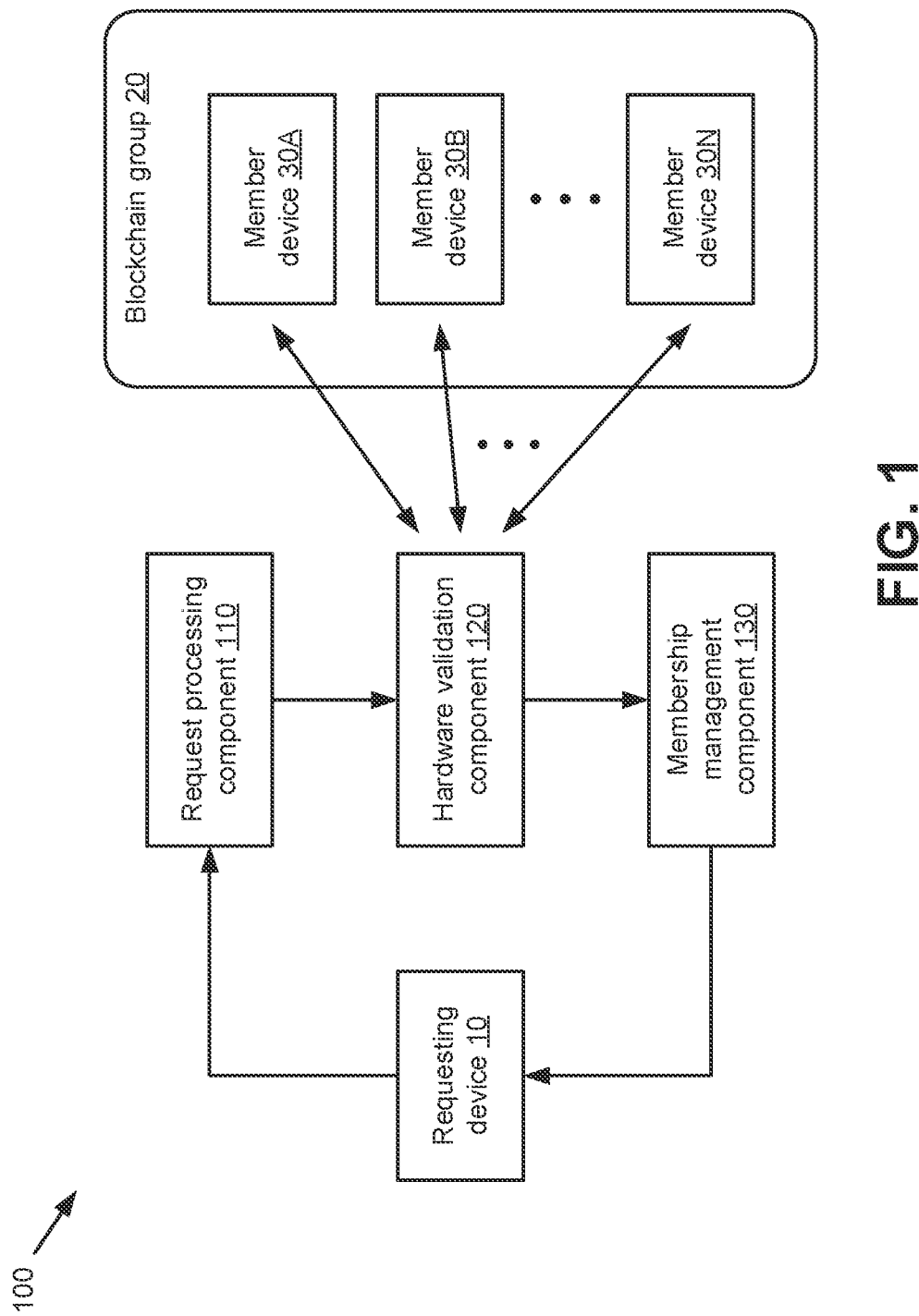
FIG. 1 is a block diagram of a system that facilitates blockchain security for distributed multi-cloud orchestration and configuration management in accordance with various implementations described herein.

With reference now to the drawings, FIG. 1 illustrates a block diagram of a system 100 that facilitates blockchain security for distributed multi-cloud orchestration and configuration management in accordance with various implementations described herein. System 100 as shown in FIG. 1 includes a request processing component 110, a hardware validation component 120, and a membership management component 130, which can operate as described in further detail below. In an implementation, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 16.

As further shown in FIG. 1, the components 110, 120, 130 of system 100 can be utilized to facilitate entry of a requesting device 10 into a blockchain group 20 composed of respective member devices 30, as well as other management operations for the blockchain group 20 as will be described in further detail below. Here, the blockchain group 20 includes N member devices 30A-30N, each of which have been admitted into the blockchain group 20 via techniques similar to those performed by system 100 as described below, e.g., prior to a time illustrated by FIG. 1, and/or by other suitable means. It is noted that the blockchain group 20 can include any suitable number of member devices 30, provided that the number of member devices 30 of the blockchain group 20 is sufficient to perform the functions described herein. It is further noted that the naming convention used for the member devices 30A-30N is not intended to imply any specific number of member devices 30.

In various implementations, the requesting device 10 and the member devices 30 of the blockchain group 20 can be physical devices such as laptop or desktop computers, smartphones, tablets, IoT devices, etc. Alternatively, the requesting device 10 and/or member devices 30 can be logical devices, such as virtual machines and/or other instanced computing environments running on a common physical device. As another alternative, the functionality of one or more devices 10, 30 shown in FIG. 1 can be distributed among multiple physical devices, e.g., devices of a computing cluster or the like. It is noted that while the components 110, 120, 130 of system 100 are depicted separately from the member devices 30 of the blockchain group 20 for purposes of illustration, the components 110, 120, 130 of system 100 could be implemented via one or more of the member devices 30 and/or other suitable devices, which could be associated with or separate from the blockchain group 20.

With respect now to the components 110, 120, 130 of system 100, the request processing component 110 can receive and/or process a request for admission of a requesting device 10 into the blockchain group 20. In an implementation, the request provided by the requesting device 10 can include hardware attestation data and/or other data relating to a hardware configuration of the requesting device 10. By way of example, the hardware attestation data can be associated with a device ownership or procurement voucher that is generated pursuant to the Fast Identity Online (FIDO) Device Onboarding (FDO) standard and/or other suitable standards. Alternatively, the hardware attestation data can be generated by the requesting device 10 at or before the time of the request. In general, the hardware attestation data can be of any form and/or content sufficient to uniquely identify the requesting device 10.

In addition, the request provided by the requesting device 10 and/or portions of the request, such as the hardware attestation data, can be signed by a device private key that is associated with the device. By way of example, a device private key can be stored via a Trusted Platform Module (TPM) chip and/or other hardware component(s) associated with the requesting device 10. More generally, the device private key can be any suitable cryptographic key that is known only to the requesting device 10.

The hardware validation component 120 of system 100 can facilitate verification, by the member devices 30 of the blockchain group 20, of the hardware attestation or configuration data provided by the requesting device 10 to the request processing component 110. This verification can be performed, e.g., based on a public key corresponding to the device private key used by the requesting device 10 to sign the request. The public key can be stored in a public key certificate associated with the requesting device 10 and/or any other suitable location. In an example utilizing the FDO protocol, the public key can be stored in the ownership voucher for the requesting device 10.

The membership management component 130 of system 100 can admit the requesting device 10 into the blockchain group 20 in response to a supermajority of the member devices 30 of the blockchain group 20 successfully validating the hardware attestation data and/or other portions of the request provided by the requesting device 10. As used herein, the term "supermajority" refers to any portion of the member devices 30 that is greater than a simple majority, i.e., 50%+1 of the member devices 30. A threshold for approval of the requesting device 10 can be any suitable proportion of the member devices 30, e.g., ⅔ of the devices, ¾ of the devices, etc., provided that a supermajority of the member devices 30 approve entry of the requesting device 10 into the blockchain group 20. By requiring greater than a simple majority of the member devices 30 to approve admission of the requesting device 10, devices entering the blockchain group 20 can be deemed trustworthy upon entry, which in turn can simplify computational complexity associated with managing the membership of the blockchain group 20, as will be described in further detail below.

Zero trust is a security framework for securing infrastructure when the traditional network boundary-based protection becomes insufficient, e.g., creating a need for identity and access control policy-based protection. Zero trust architecture is based on two principles: (1) no implicit trust, and (2) trust must be explicitly established and continuously validated. A large part of the computational complexity and performance overhead associated with blockchain applications is due to guarding against unreliable and untrustworthy parties.

Accordingly, system 100 can be used to apply zero trust principles, e.g., to balance the cost of validating trustworthiness of participating parties and the cost of computational complexity associated with guarding against untrustworthy participating parties. In doing so, system 100 can reduce computational complexity, improve transaction throughput performance, reduce storage requirements, and/or provide other similar benefits that can improve the performance of a computing system. By establishing initial trustworthiness of a device using zero trust principles as described above with respect to FIG. 1, subsequent transactions can be approved with a simple majority of member devices without further mechanisms such as proof of work, proof of stake, or the like, that provide transaction validity by requiring member devices to demonstrate an interest in transaction approval.

Figure 2:
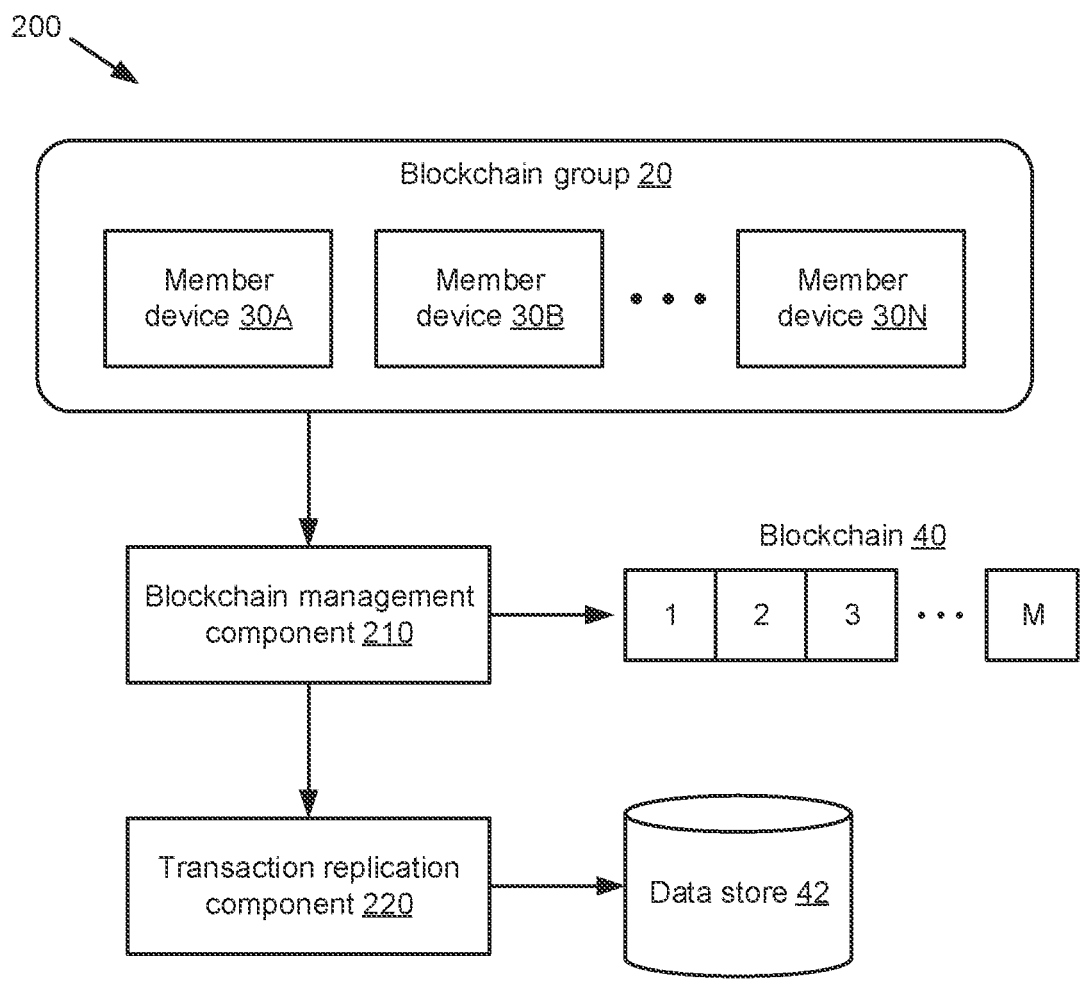
FIG. 2 is a block diagram of a system that facilitates blockchain management and external transaction replication in accordance with various implementations described herein.

Turning to FIG. 2, a block diagram of a system 200 that facilitates blockchain management and external transaction replication is illustrated. Repetitive description of like elements that are employed in other embodiments described herein is omitted for brevity. System 200 as shown in FIG. 2 includes a blockchain management component 210 that can facilitate recording of transactions associated with a blockchain group 20 into respective blocks of a blockchain 40 maintained by the blockchain group 20, e.g., via its respective member devices 30.

In an implementation, improved trustworthiness of the member devices 30 of the blockchain group 20, e.g., via zero trust principles as described herein, can enable the blockchain management component 210 to set an upper bound on the size of the blockchain 40, e.g., defined by a maximum length (block count) value M. As a result, the blockchain management component 210 can constrain the blockchain 40 such that it contains only the M newest transaction records. As further shown in FIG. 2, system 200 further includes a transaction replication component 220 that can replicate transactions recorded in the respective blocks of the blockchain 40 to a secure distributed data store 42, e.g., a database or other suitable data structure. Unlike the blockchain 40, the data store 42 can be unbounded by the maximum length value M, enabling more efficient storage and retrieval of all transaction records in the history of the blockchain 40. In an implementation, the maximum block count M can be chosen by the blockchain management component 210 based on properties of the blockchain group 20 and/or its respective member devices 30 and/or based on any other suitable criteria.

By restricting the number of blocks in the blockchain 40 to M, the integrity and consistency of the blockchain 40 can be validated using less computational and storage resources. For instance, if a transaction associated with an unbounded blockchain is challenged, the entire chain must be verified from block to block to ensure that the integrity of the entire chain has not been compromised, which can be significantly computationally expensive for a large blockchain. In contrast, because the trustworthiness of the member devices 30 of the blockchain group 20 is constantly validated, the number of records of the blockchain 40 can be bounded to a maximum length M. Subsequently, if a dispute regarding one of the most recent M records arises, verification of the blockchain 40 is limited to the most recent M blocks, and/or the data store 42, which can significantly reduce overhead.

Additionally, by constraining the blockchain 40 to M blocks, the list of blocks in the blockchain 40 can be made a secondary storage mechanism, enabling a more efficient data store 42 to be used as a primary storage mechanism to improve read/write performance and reduce overall storage size. In some implementations, new transaction records approved by the blockchain group 20 can be added by both the blockchain management component 210 and the transaction replication component 220 to the blockchain 40 and the data store 42, respectively, as those records are approved. Alternatively, the data store 42 can be utilized to store records that are older than the M records of the blockchain 40. For instance, the transaction replication component 220, and/or the blockchain management component 210, can remove an oldest transaction from the blockchain 40 and replicate that transaction to the data store 42 in response to determining that the number of blocks of the blockchain exceeds the maximum length M. Other techniques could also be used.

In an implementation, a new blockchain 40 can be formed via the blockchain management component 210 by a first member device, e.g., member device 30A shown in FIG. 2, which can be an IoT device, a server device, or any other suitable device. The first member device can initialize the blockchain 40 and create the first block, i.e., the genesis block. The first member device can also generate a new root key pair and an X.509 certificate or other suitable certificate. The first member device can also generate another key pair for itself (referred to herein as a member self key pair) and issue a X.509 certificate to itself as its own X.509 certificate, which can be signed by a membership root certificate. The first member device can also initialize the maximum number of blocks M allowed in the blockchain 40 so that the size of the distributed ledger associated with the blockchain 40 will not grow without bound.

The first blockchain record generated by the first member device can contain the device identifier (ID), device X.509 certificate, and root membership certificate, each of which can show that the first member device formed the blockchain 40. This first record can also be stored in the distributed data store 42, e.g., via the transaction replication component 220. It is noted that the private keys discussed above can be kept by the first member device in a private, secured data store, i.e., as opposed to any distributed data store or distributed ledger. Options for storing the private key can include a Trusted Platform Module (TPM) associated with the first member device, a secure store (e.g., a credential vault) associated with a Management Controller, and/or other embedded components that can provide secure storage.

As noted above, the distributed ledger can be configured with a maximum size M. When the maximum block size is reached, and a new record block is to be added, the oldest record block can be discarded. The size M can be chosen, e.g., by the first member device, to be large enough to effectively protect the immutability of records in the distributed ledger. The contents of the data store 42 can be updated accordingly in response to a record block being discarded from the blockchain 40. The data store 42 can provide a more efficient way to maintain transaction records, providing a balance between protecting more recent transaction record immutability by cryptographical links and protecting the immutability of all records via the distributed data store 42.

As further noted above, system 200 can be configured such that there is no implicit trust. Accordingly, a party device (e.g., an IoT device, a server device, etc.) can be configured to establish a trusted relationship in order to become a new member device 30. A new device can onboard to the blockchain 40 by using one or more onboarding procedures known in the art, such as FDO, combined with TPM-based attestation validation. This new member device can generate a key pair for the membership application.

While the blockchain 40 and data store 42 are illustrated as structures separate from the blockchain group 20 for purposes of illustration, it is noted that these and/or other data structures can be distributed among the respective member devices 30 of the blockchain group 20. For instance, each member device 30 can locally store some or all of a distributed ledger associated with the blockchain 40 as well as some or all of the data store 42. In some implementations, the data store 42 can also be stored on one or more devices outside the blockchain group 20, e.g., a storage server or similar device, to facilitate high availability of the data store 42.

As described above with respect to FIG. 1, new membership requests with corresponding device credentials can be validated and approved by a supermajority of existing member devices 30 (e.g., at least ⅔ of the member devices 30). A device can sign a new membership request, including associated device attestation data, by using the device private key (e.g., where the private key serves as the device credential) that is sealed in the device TPM chip. Voting member devices 30 can then verify the device signature using, e.g., a corresponding device public key stored in a device public certificate in an ownership voucher corresponding to the device and/or any other suitable public key. Additionally, voting member devices 30 can also validate the device attestation data against a corresponding record in the ownership voucher. A new X.509 certificate associated with a device public key can be issued to a new member device using the unique device ID of the new device.

In an implementation, by requiring a supermajority (e.g., ⅔ of more) of member devices 30 to approve a new member request, system 200 can be tolerant to a remaining portion (e.g., ⅓ of the member devices 30) being faulty or otherwise untrustworthy. As will be described in further detail below with respect to FIG. 3, a new member device can also receive a root certificate. Additionally, a new blockchain record can be added, which can contain the new member ID and corresponding X.509 certificate. Subsequently, the new member device can replicate the data store 42 and distributed ledger from any of the existing member devices 30. As will be further described below, member devices 30 can also be configured to sign all request and vote messages so that the devices can be held accountable.

Figure 3:
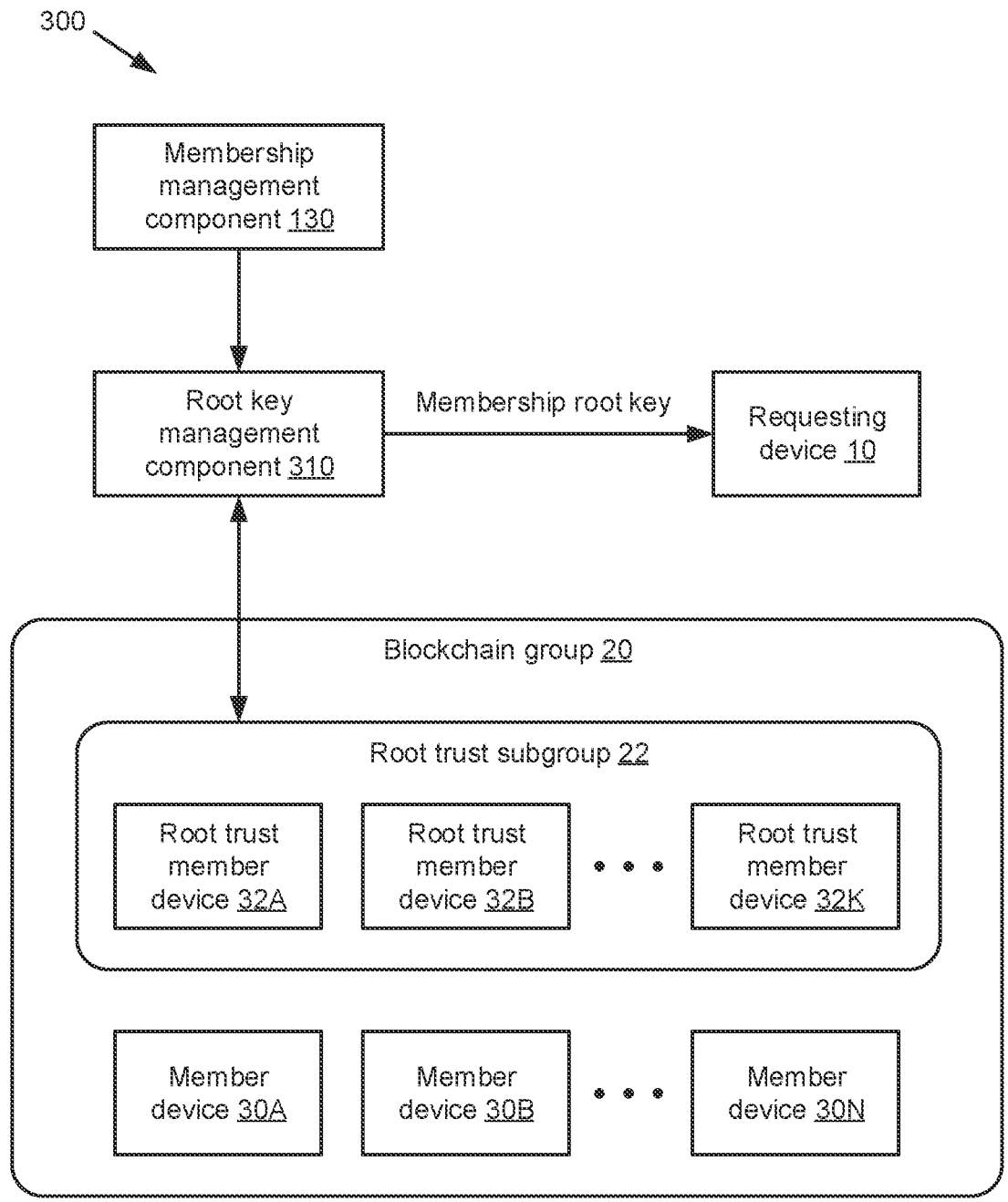
FIG. 3 is a block diagram of a system that facilitates management of a membership root key for a blockchain computing group in accordance with various implementations described herein.

Turning next to FIG. 3, a block diagram of a system 300 that facilitates management of a membership root key for a blockchain computing group 20 is illustrated. Repetitive description of like elements that are employed in other embodiments described herein is omitted for brevity. As shown in FIG. 3, system 300 includes a root key management component 310 that, in response to a requesting device 10 being admitted into a blockchain group 20 (e.g., by a membership management component 130 as described above with respect to FIG. 1), can facilitate issuance of a membership root key associated with the blockchain group 20 to the requesting device 10.

In an implementation, the membership root key can be a cryptographic key associated with a given system, e.g., the blockchain group 20. Additionally, the membership root key can be signed by a private root key that is maintained by a root trust subgroup 22 of the blockchain group 20. The root trust subgroup 22 can include a subset of the member devices 30, referred to in FIG. 3 as root trust devices 32, that is less than all of the member devices 30. It is noted that each of the root trust member devices 32 are also member devices 30 of the blockchain group 20 as a whole. Here, the root trust subgroup 22 contains K root trust member devices 32A-32K for a defined value of K. It is further noted that the naming convention used for the root trust member devices 32A-32K is not intended to imply any specific number of root trust member devices 32, and that the root trust subgroup 22 can include any suitable number K of root trust member devices 32. In one implementation, K can be any odd number greater than or equal to 3, e.g., to ensure that votes on transactions associated with the root trust subgroup 22 as described in further detail below are not deadlocked. Other implementations, which can utilize other definitions of K, are also possible.

In an implementation, the initial members of the root trust subgroup 22 can be the first K member devices 30, such that a blockchain membership root key associated with the root trust subgroup 22 is replicated only to the first K member devices 30 to keep a balance between root key availability and security protection. Subsequently, the root key management component 310 can select, as the root trust member devices 32 of the root trust subgroup 22, the K member devices 30 of the blockchain group 20 that have accurate (consistent) transaction approval records that are greater than a defined threshold length. This threshold can be an absolute threshold or a relative threshold, e.g., defined such that the K member devices 30 with the longest consistent records are selected as the root trust member devices 32.

Figure 4:
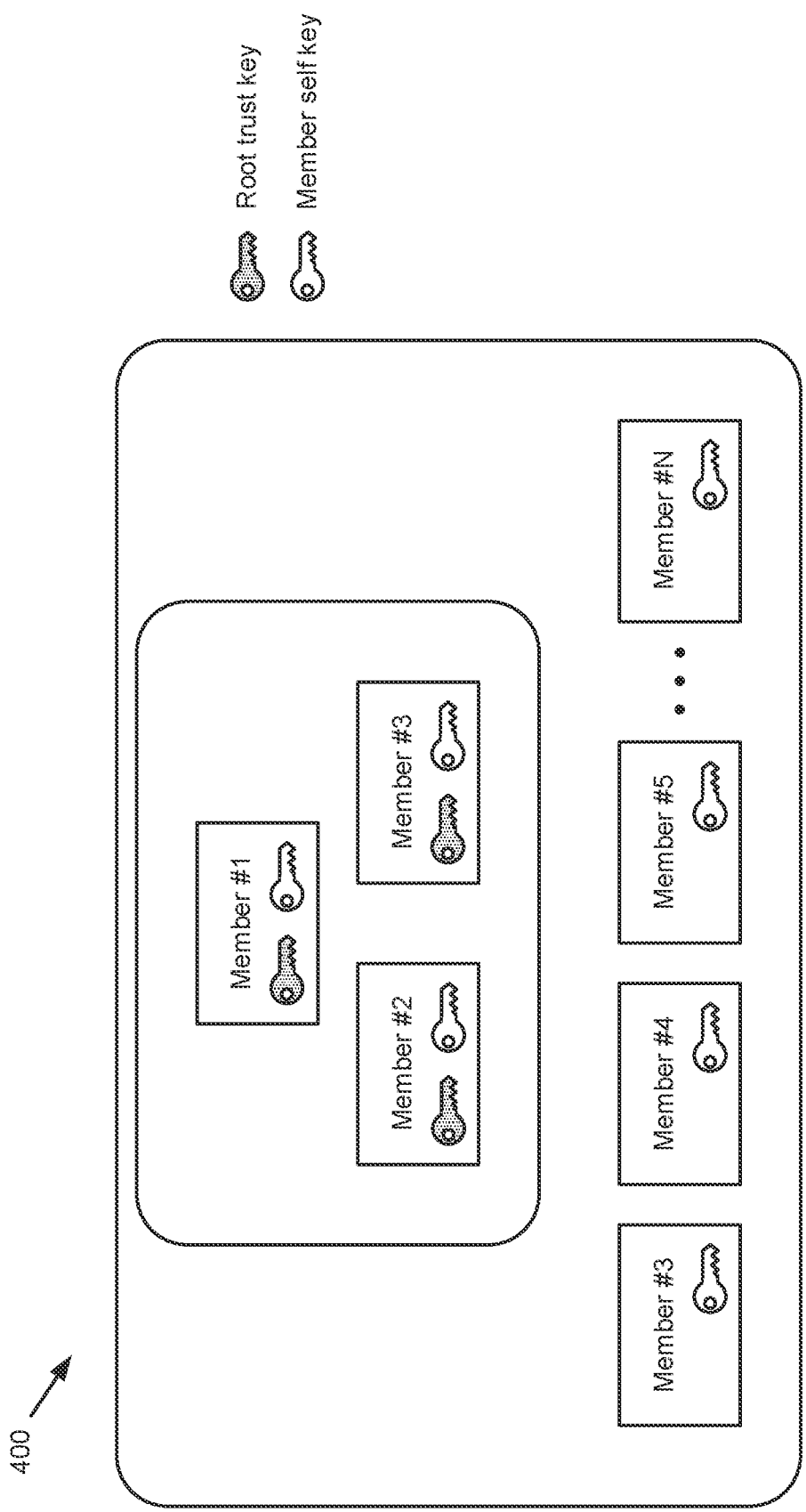
FIG. 4 is a diagram depicting an example zero trust secured blockchain topology in which various implementations described herein can function.

Diagram 400 in FIG. 4 shows a non-limiting example of a blockchain group topology where K=3. As shown in diagram 400, the first three members form a smaller root trust membership group that is responsible for managing the membership root key and issuing root key signed X.509 membership certificates upon member request. In an implementation, root trust membership can be tracked by immutable blockchain records.

In another implementation, a member device 30 of the blockchain group 20, which may or may not be a root trust member device 32, can be designated as a leader, e.g., via election of all member devices. Subsequently, new management transaction requests can be sent to the leader device, which can then propose the transaction to all member devices 30 via a two-phase commit protocol. The corresponding management transaction can then be accepted upon approval by a simple majority of the member devices 30. Because becoming a member device 30 requires supermajority approval, e.g., as described above with respect to FIG. 1, acceptance of a transaction can be achieved via simple majority approval due to higher member trustworthiness.

A member device 30 can be designated as the leader for a defined lease term. When the term of a leader expires, a new member device 30 can be elected as leader using similar procedures to those described above. By facilitating proposal of new transactions through a designated leader device, the possibility of conflicting proposals can be reduced.

Figure 5:
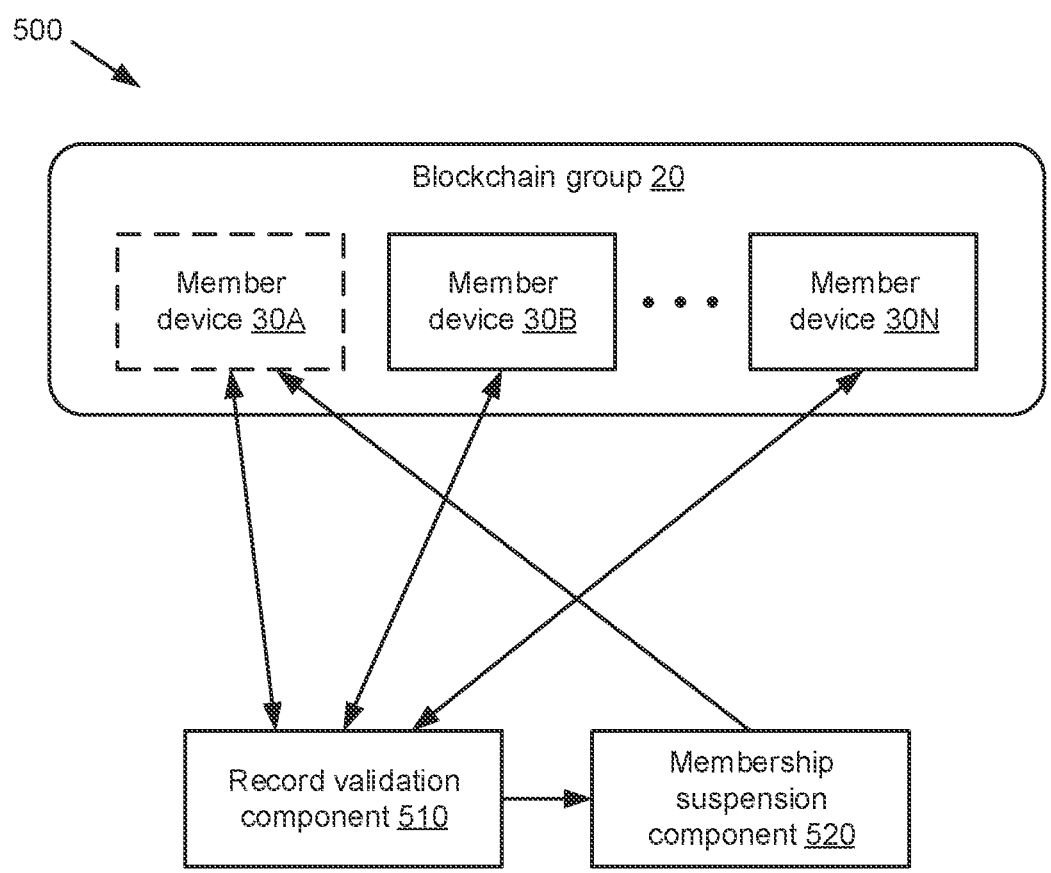
FIG. 5 is a block diagram of a system that facilitates membership suspension in a blockchain computing group in accordance with various implementations described herein.

With reference now to FIG. 5, a block diagram of a system 500 that facilitates membership suspension in a blockchain computing group 20 is illustrated. Repetitive description of like elements that are employed in other embodiments described herein is omitted for brevity. System 500 as shown in FIG. 5 includes a record validation component 510 that can track and/or otherwise monitor transaction approval records, e.g., votes on transaction requests, associated with the respective member devices 30 of the blockchain group 20. Based on these records as monitored by the record validation component 510, respective actions, such as membership suspension via a membership suspension component 520, membership revocation as will be described below with respect to FIG. 6, and/or other actions can be performed.

With reference to system 500, the membership suspension component 520 can suspend the membership of a member device 30 (here, member device 30A), e.g., by preventing that member device from approving new transactions associated with the blockchain group 20, in response to that member device 30 failing to vote for and/or otherwise validate M consecutive transactions, where M is the maximum length of the blockchain 40 as described above with respect to FIG. 2. Because the distributed ledger contains a maximum length of M blocks, missing M consecutive transactions means that the member device 30 has no useful records in its copy of the distributed ledger, rendering the member device 30 unable to validate those records.

In an implementation, a device whose membership is suspended, e.g., member device 30A, can request membership renewal by submitting a request that demonstrates its possession of the device membership private key (e.g., via a digital signature). The membership suspension component 520 can then reinstate the suspended member device 30A, e.g., by re-enabling the member device to approve new transactions associated with the blockchain group 20, in response to a simple majority of the other member devices 30 validating and approving the request. In response to or prior to reinstatement, the suspended member device 30A can obtain the M most recent transaction records from other member devices 30 of the blockchain group 20.

Figure 6:
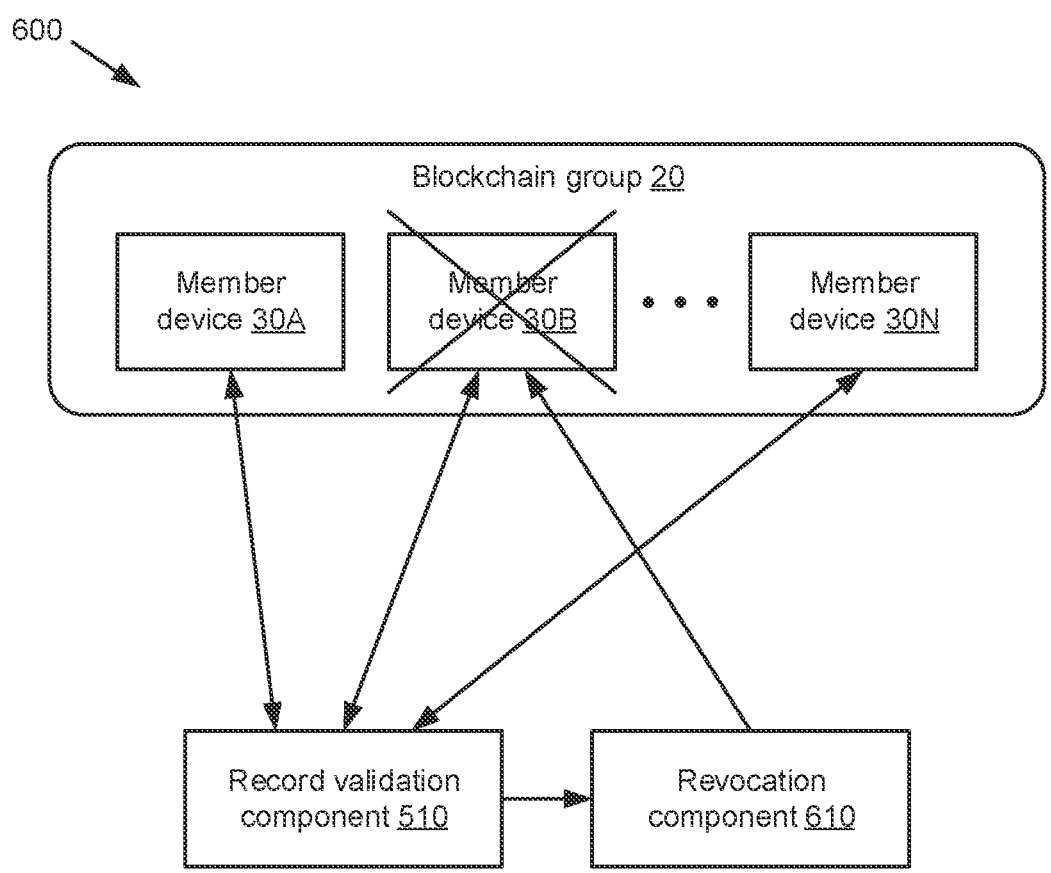
FIG. 6 is a block diagram of a system that facilitates membership revocation in a blockchain computing group in accordance with various implementations described herein.

Turning to FIG. 6, a block diagram of a system 600 that facilitates membership revocation in a blockchain computing group 20 is illustrated. Repetitive description of like elements that are employed in other embodiments described herein is omitted for brevity. System 600 as shown in FIG. 6 includes a revocation component 610, which can revoke the membership of a member device 30 of the blockchain group, here member device 30B, in response to the record validation component 510 determining that the voting record of the revoked member device 30B is inconsistent with the majority. Stated another way, the revocation component 610 can remove a member device 30 from the blockchain group 20 in response to the record validation component 510 determining that the member device 30 has a first transaction approval record that is inconsistent with respective second transaction approval records of a majority of the member devices 30.

In an implementation, the voting record of a member device 30 can be deemed inconsistent by the revocation component 610 based on a defined number of transaction request votes being different from those of the majority of other member devices 30. This number of votes can be any suitable number, including one vote or multiple votes, that is deemed sufficient by the revocation component 610 as an indication of device failure, vote tampering and/or the integrity of the device otherwise being compromised, etc. Additionally, the number of votes used by the revocation component 610 can be over the lifetime of the tenure of the member device 30 in the blockchain group 20 and/or over a smaller interval, e.g., the M most recent transactions.

Once the membership of a given member device is revoked, the device can be required to apply for a new membership, with supermajority approval, using the procedure described above with respect to FIG. 1 for a requesting device 10. Additionally, repeatedly voting inconsistently with the majority can cause the revocation component 610 to permanently lock out a device from the blockchain group 20, e.g., with no option to rejoin.

Figure 7:
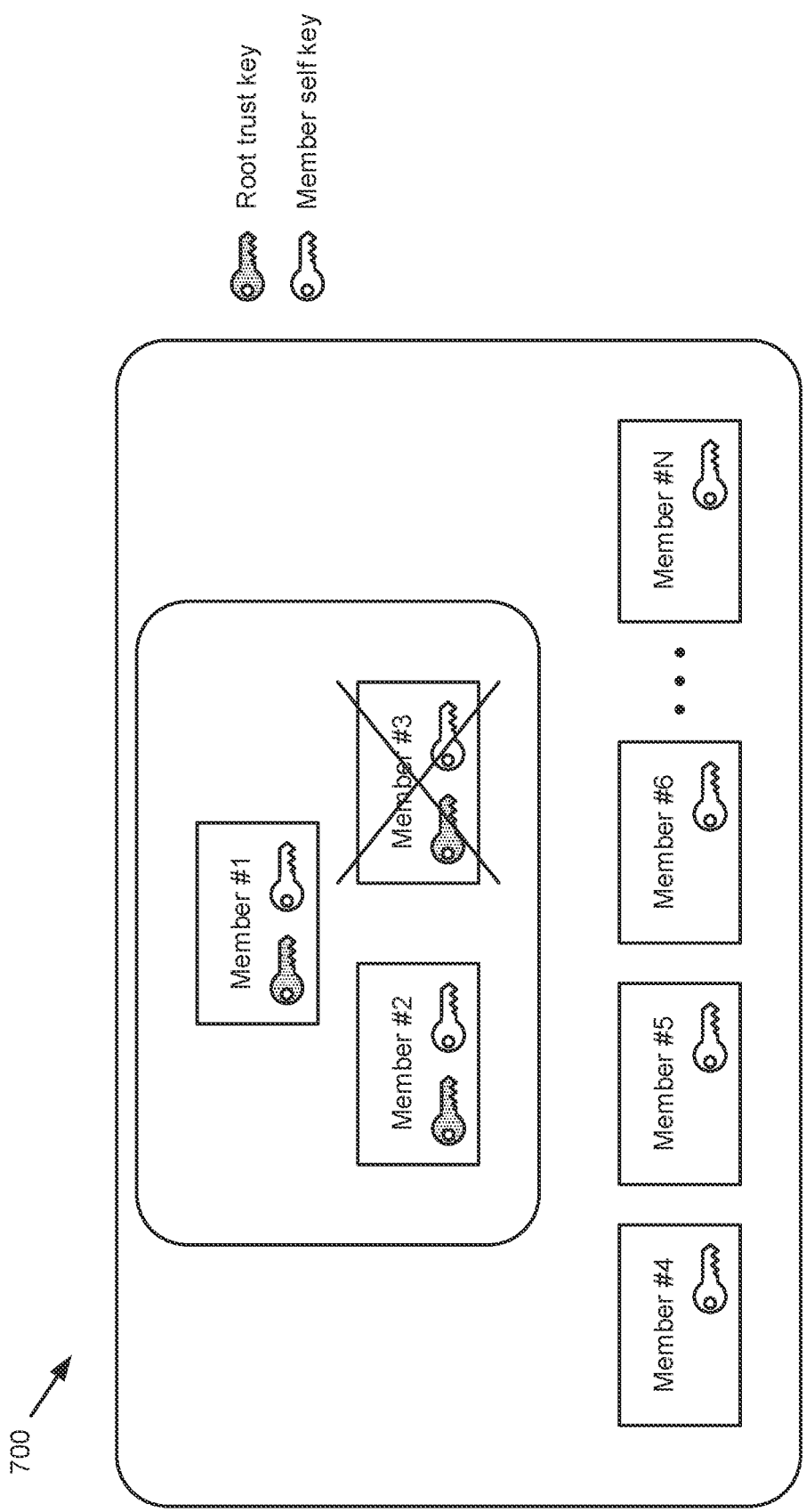
FIGS. 7-9 are diagrams depicting respective stages of an example process for replacing a root trust subgroup member in a blockchain computing group in accordance with various implementations described herein.
Figure 8:
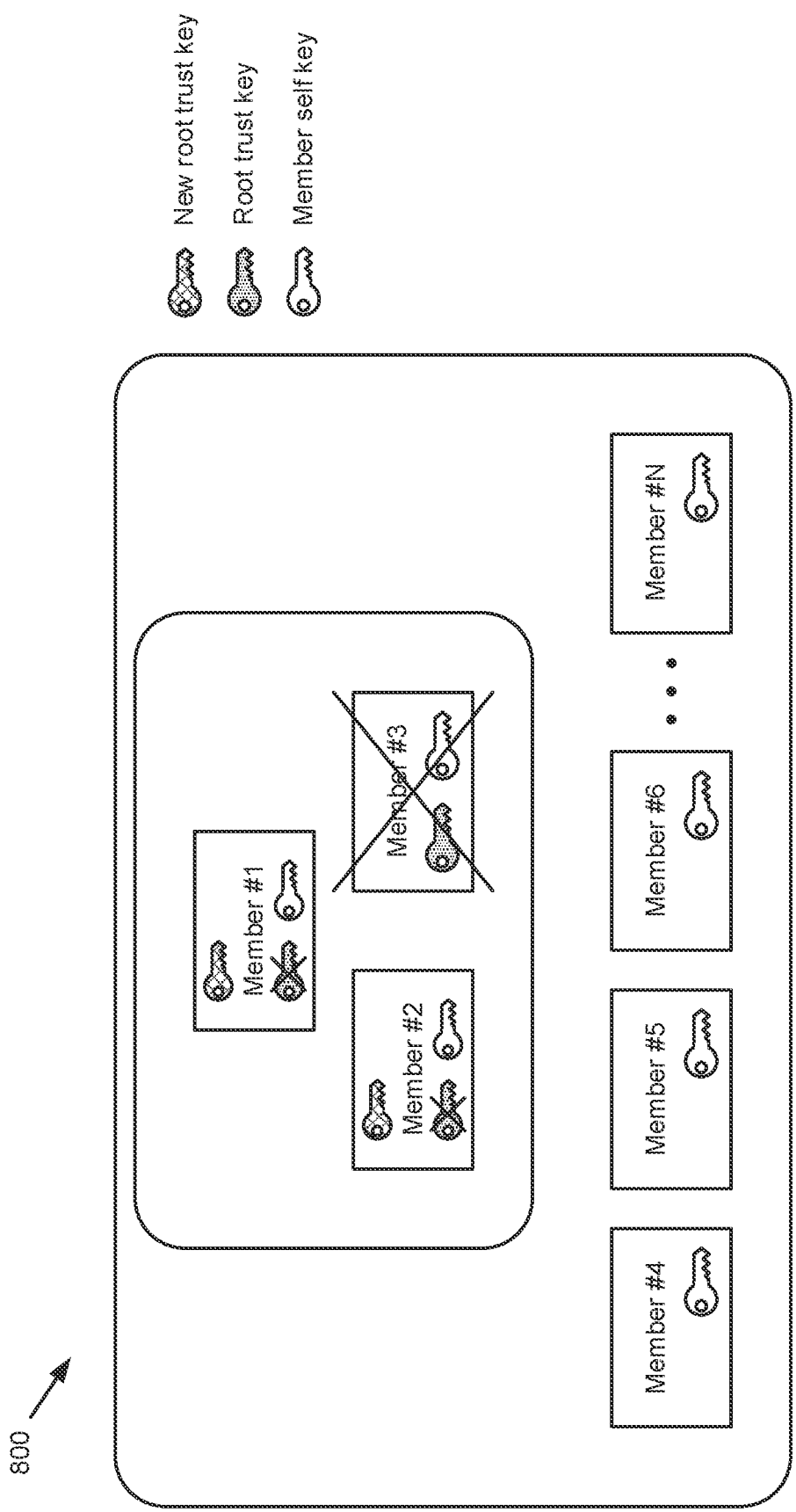
Figure 9:
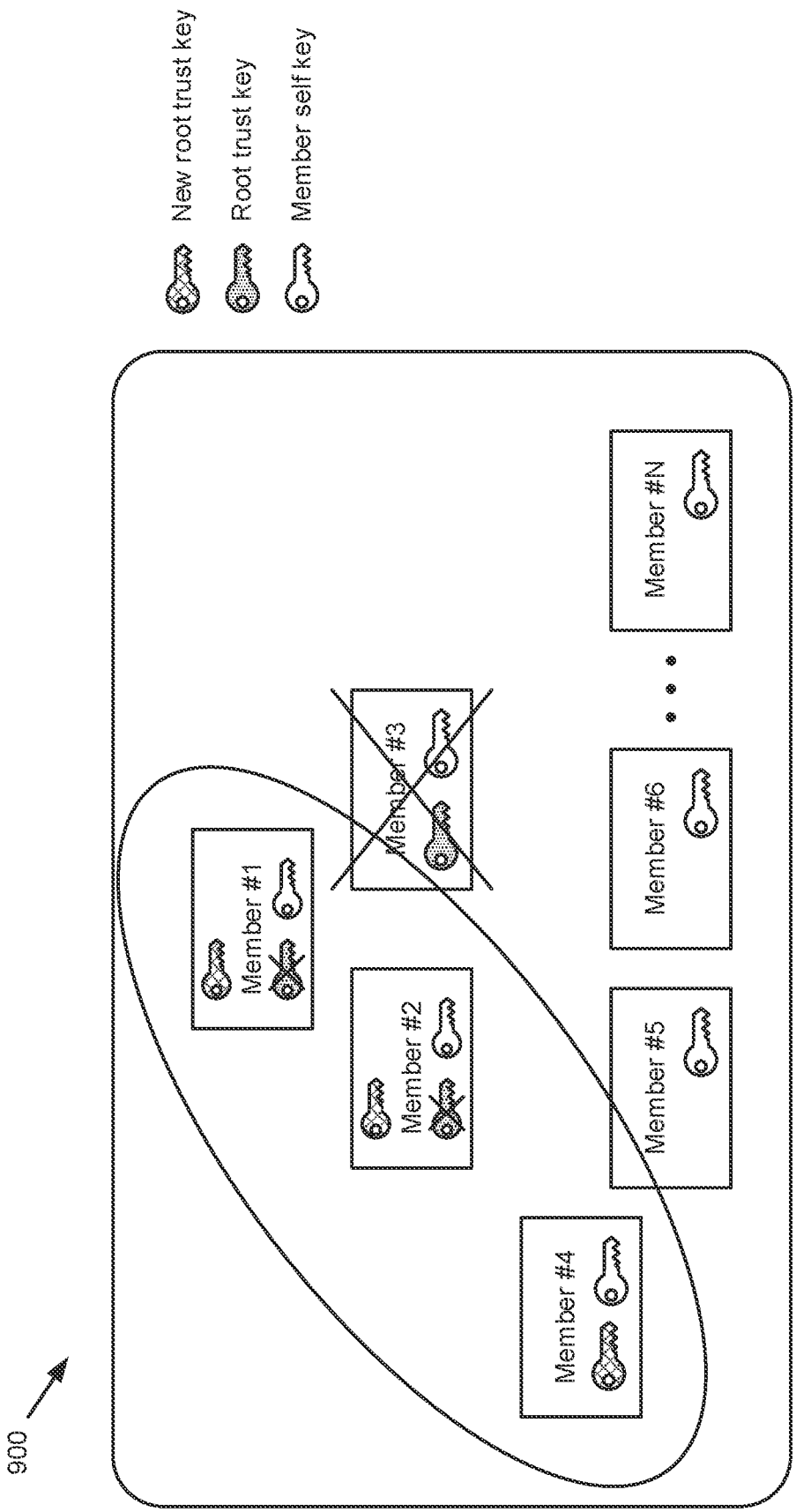

Referring now to FIGS. 7-9, respective diagrams 700, 800, 900 depicting stages of a process for removing and replacing a root trust member, e.g., a root trust member device 32 of the root trust subgroup 22, are provided. In an implementation, the membership of a root trust member can be revoked in response to that member voting inconsistently with the majority, e.g., as described above with respect to FIG. 6. Additionally, a root trust member can be removed from the root trust group, or the blockchain group as a whole, in response to other events, such as the root trust member leaving the blockchain group or the root trust group, the root trust member losing its copy of the membership root key, or the like. A procedure for managing the membership of a root trust member device is described in further detail below with respect to FIG. 14.

With reference now to diagram 700 in FIG. 7, when the membership of one of the K root trust members is revoked, here member #3, the number of members having a copy of the membership root key drops below K, i.e., to K−1. As a result, another member of the group can be selected as a replacement root trust member. While FIGS. 7-9 illustrate an example where the root trust group has three members, it is noted that similar concepts to those illustrated by FIGS. 7-9 can be applied to a root trust group with any suitable number K of members.

As shown by diagram 800 in FIG. 8, prior to adding a new root trust member, the root trust key can be replaced since the revoked root member, e.g., member #3, is a copy of the original root key. As such, the remaining K−1 members of the root trust members can jointly generate a new root key pair, including public and private root keys, to replace the old root key. Alternatively, one of the remaining root trust members can request to individually generate a new root pair, and the requesting root trust member can then generate the root pair in response to approval of the request by a supermajority (e.g., at least ⅔) of the root trust group and a majority of all members of the group. In the event that the new root key pair is generated by a single device, the other devices of the root trust group can request a copy of the key pair from the generating member.

Next, as shown by diagram 900 in FIG. 9, a new root trust member can be selected from the remaining group of active members, based on a ranking of how long the respective members have had membership in the group. In the example shown by diagram 900, member #4 is active and the most senior member among the non-root trust members. An existing member of the root trust membership group, e.g., member #1 or member #2, can request adding member #4 as a replacement root trust member. If approved by a simple majority of the members including member #4, member #4 can be added as a new root trust member. If not approved, existing root trust members can repeat the request for the next most senior member, e.g., member #5, and so on until successful. After being approved to be a new root trust member, the new root trust member can request a copy of the root trust key from other members of the root trust membership group. Since the root key pair has changed, the root trust membership group can subsequently issue a replacement X.509 certificate, signed by the new root trust key, to all members.

Figure 10:
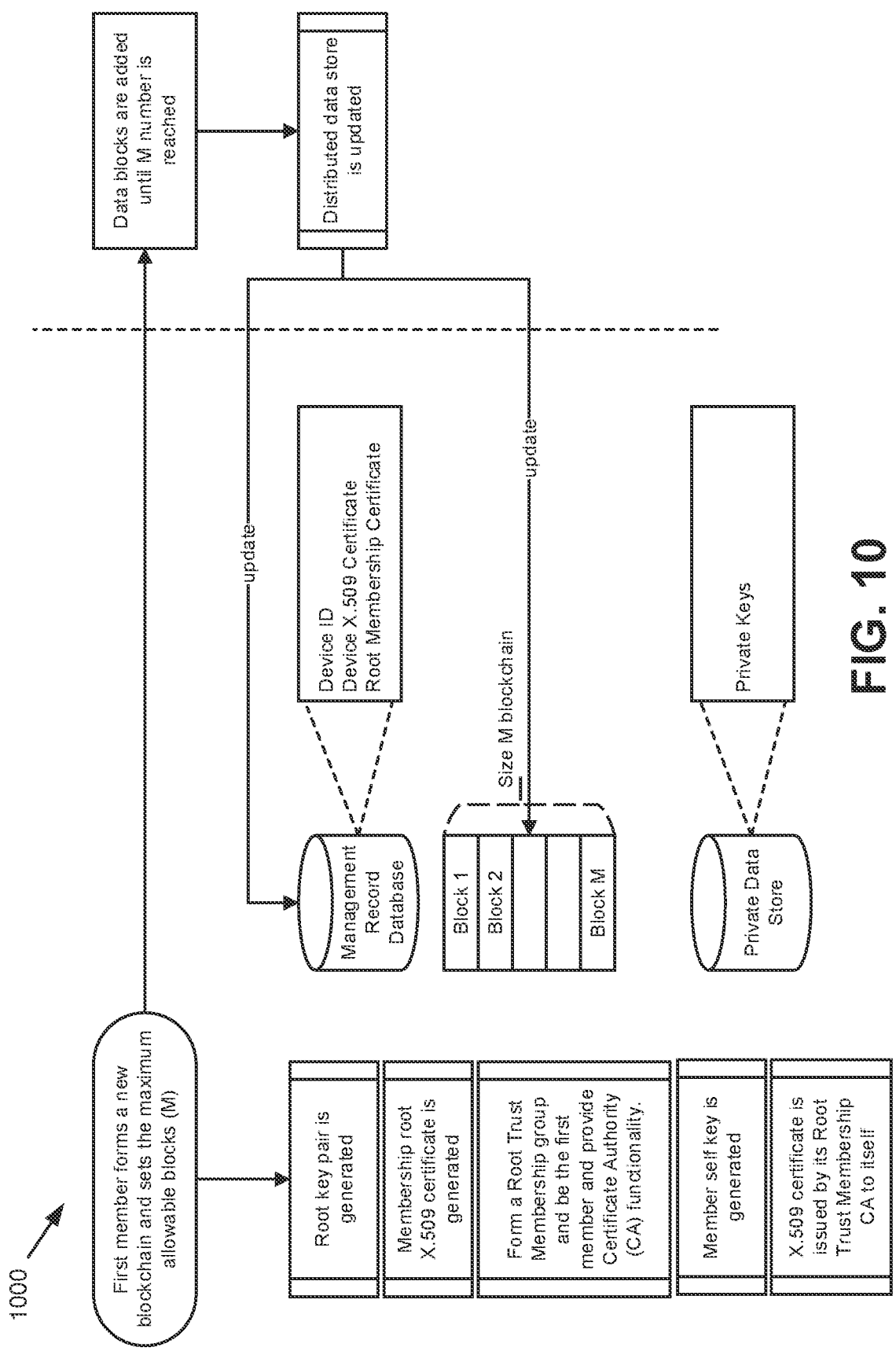
FIG. 10 is a functional flow diagram depicting an example process for creating a blockchain in accordance with various implementations described herein.

Turning now to FIG. 10, a functional flow diagram 1000 depicting an example process for creating a blockchain is illustrated. As shown in diagram 1000, a first member (e.g., a member device 30) can form a new blockchain and set the maximum number M of blocks, e.g., as described above with respect to FIG. 2. The first member can also perform a series of sub-processes at this time as further shown in diagram 1000, including generating a root key pair and membership X.509 certificate, forming a root trust membership group and providing certificate authority functionality for the group, generating a member self key, and issuing an X.509 certificate to itself via the certificate authority.

Upon creation of the blockchain, data blocks can be added to the chain until M blocks are reached. Subsequently, a distributed data store (e.g., a data store 42), referred to here as a management record database, can be updated with corresponding transaction records. While updates to the blockchain and the management record database can occur together as shown in diagram 1000, other techniques could also be used, such as by pushing transactions to the database once the maximum chain length is reached.

As further shown in diagram 1000, each member can utilize a private data store, e.g., implemented via a device TPM chip and/or other suitable structures, to store private keys corresponding to the respective members and/or other data.

Figure 11:
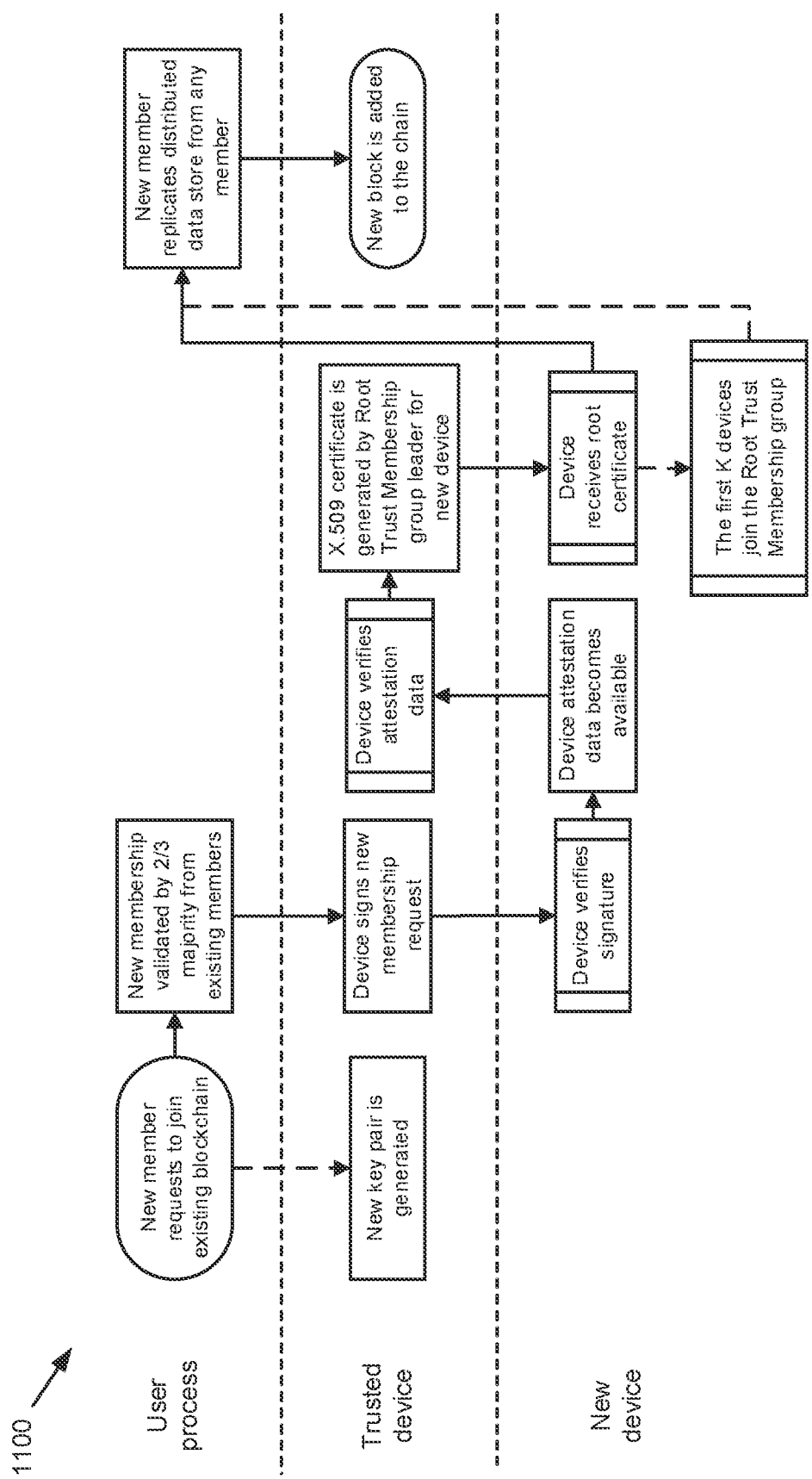
FIG. 11 is a functional flow diagram depicting an example process for adding a member device to a blockchain computing group in accordance with various implementations described herein.

Referring now to FIG. 11, a functional flow diagram 1100 depicting an example process for adding a member device to a blockchain computing group is illustrated. Here, "user processes" refer to actions performed by a user, e.g., an operator of a requesting device and/or member device, "trusted devices" refer to devices already in the blockchain, e.g., member devices 30, and the "new device" refers to a device requesting to enter the blockchain, e.g., a requesting device 10. For the purposes of diagram 1100, it is assumed that all approvals are timely obtained.

As shown in diagram 1100, a new member device, via its user, can request to join an existing blockchain, and this request can be validated by a supermajority, e.g., ⅔, of existing members. A trusted device can then sign a new membership request corresponding to the new member, and the signature can be verified by the new member. Once device attestation data for the new member is available, the new member can provide this data to the trusted devices for verification. Upon successful verification, an X.509 certificate is generated by the root trust membership group and provided to the new device. If the new device is one of the first K devices in the blockchain, the new device can also join the root trust membership group at this time. After the new member joins the blockchain, the member, e.g., via its user, can replicate the distributed data store from any existing member. A new block, corresponding to the new member joining the blockchain, is also added to the chain.

Figure 12:
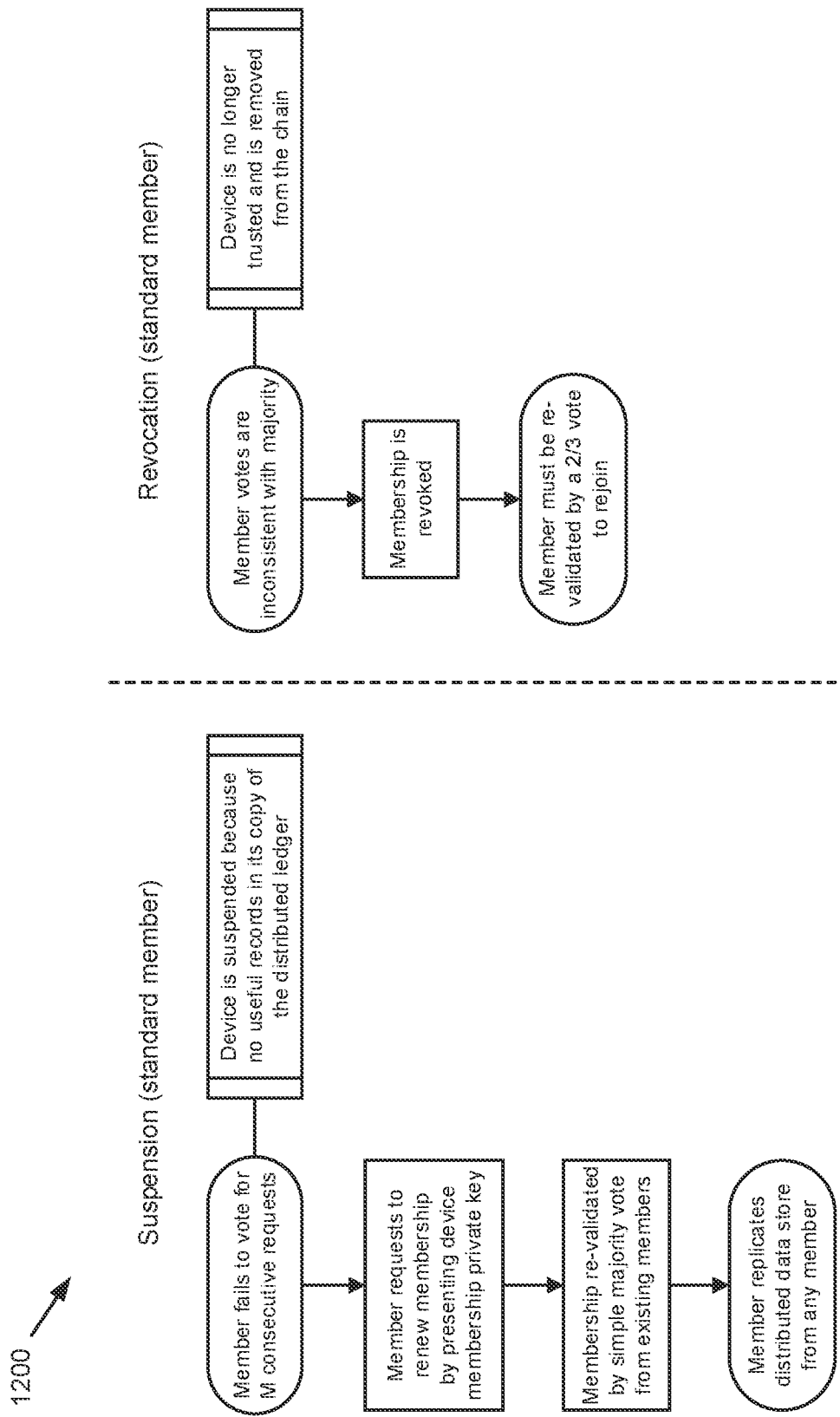
FIG. 12 is a functional flow diagram depicting example processes for removing a member device from a blockchain computing group in accordance with various implementations described herein.

Turning to FIG. 12, a functional flow diagram 1200 depicting example processes for removing a member device from a blockchain computing group is illustrated. As shown in diagram 1200, removal of an existing member can be performed via suspension of the member, e.g., in response to the member failing to vote for M consecutive requests, and/or revocation of the member, e.g., in response to the member voting inconsistently with the majority.

As shown in the suspension procedure, a member can be suspended if that member has no useful records in its copy of the distributed ledger. A suspended member can request to renew its membership by presenting its device membership private key, which can then be re-validated by a simple majority vote of the remaining existing members. Upon the suspended member successfully renewing its membership, that member can then replicate the distributed data store from any existing member.

In contrast, as shown in the revocation procedure, a revoked member is deemed no longer trusted and is removed from the blockchain. The revoked member must then re-initiate the procedure to be added to the blockchain, e.g., as shown in diagram 1100, and be re-validated by a supermajority (e.g., ⅔) of existing members to rejoin.

Figure 13:
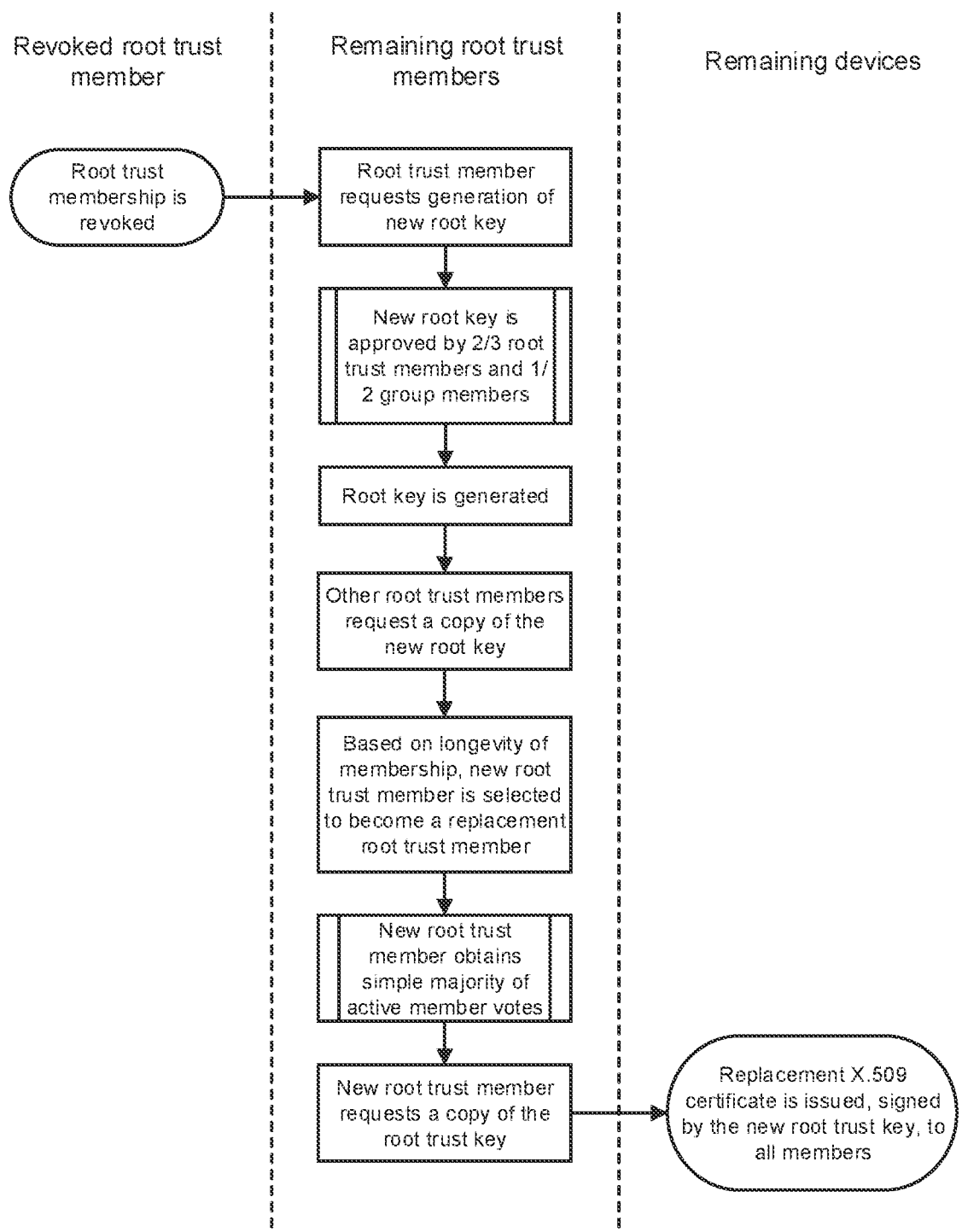
FIG. 13 is a functional flow diagram depicting an example process for removing a member device from a root trust group in accordance with various implementations described herein.

With reference now to FIG. 13, a functional flow diagram 1300 depicting an example process for removing a member device from a root trust group is illustrated. It is noted that diagram 1300 depicts a process for revoking the root trust membership of a device. In some cases, root trust membership can also be suspended, as will be further described below with respect to FIG. 14.

As shown in diagram 1300, when the root trust membership of a device is revoked, a remaining root trust member can request generation of a new root key. Upon approval by a supermajority (e.g., ⅔) of the remaining root trust members and a majority of all group members, the root key is generated and provided to the other root trust members via requests submitted by those members. Next, a replacement root trust member is selected based on longevity of membership, e.g., the most senior non-root trust member is selected. This member can then be admitted into the root trust group upon approval by a majority of all active members. If a given member fails to gain this approval, this process can then be repeated for the next most senior member, and so on.

Once a member is successfully admitted into the root trust group, the member can request a copy of the root trust key. Additionally, a replacement X.509 certificate, signed by the new root trust key, can be distributed to all members.

Figure 14:
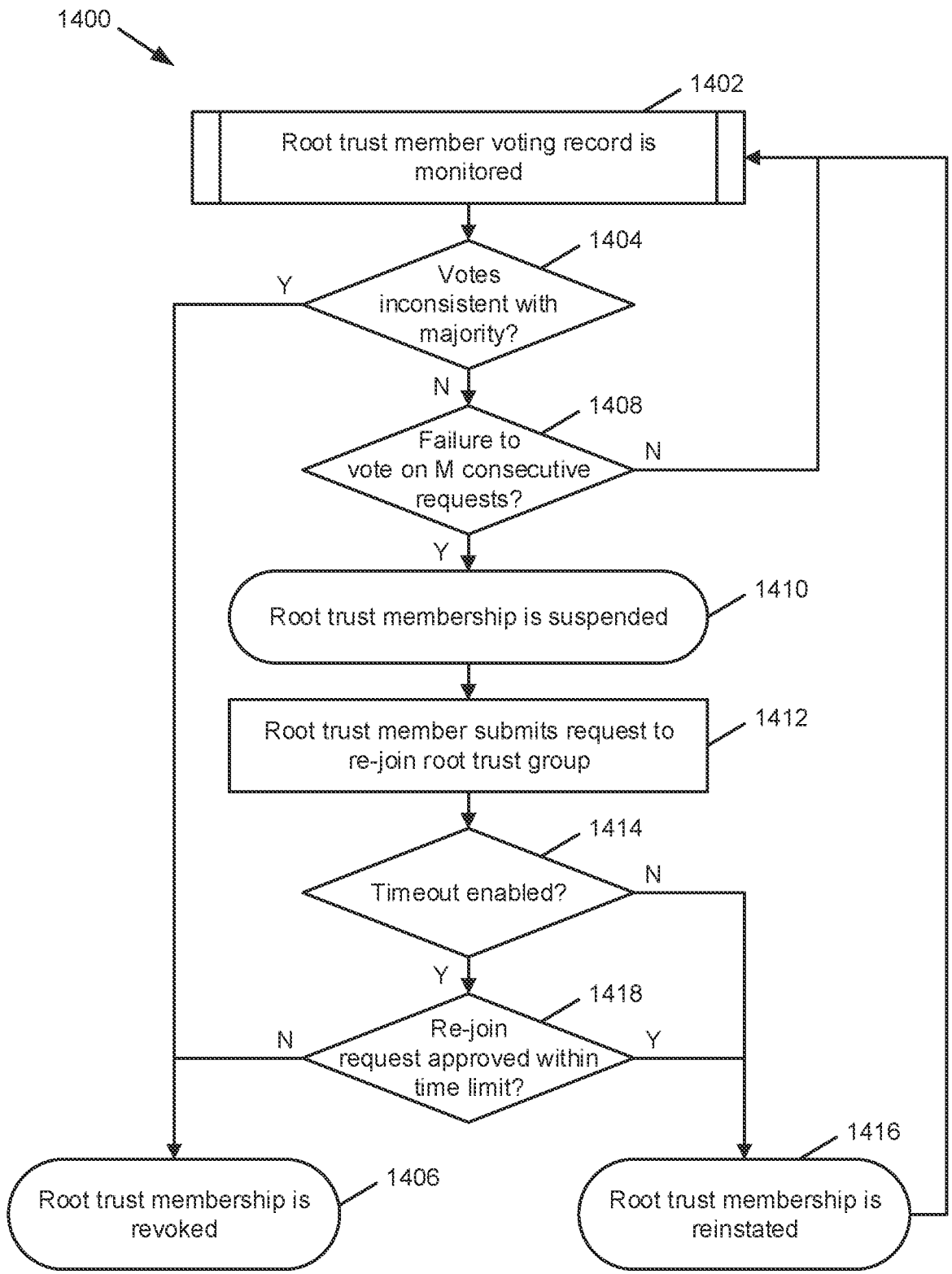
FIG. 14 is a flow diagram of a method that facilitates managing the membership of a root trust member device in accordance with various implementations described herein.

Turning now to FIG. 14, a flow diagram of a method 1400 that facilitates managing the membership of a root trust member device is illustrated. At 1402, the voting record of the root trust member is monitored (e.g., by a record validation component 510). At 1404, in response to determining that the root trust member has a voting record that is inconsistent with the majority of other members of the underlying blockchain group, the root trust member is expelled from the root trust membership, e.g., by revoking root trust membership, at 1406. Because an inconsistent voting record is an indicator of software/hardware malfunction or attempted blockchain manipulation, the device can be deemed no longer trustworthy and can further be expelled from the blockchain group as a whole, e.g., as described above with respect to FIG. 12 for a normal member.

If the voting record of the root trust member is not inconsistent, method 1400 continues to 1408, where it is determined whether the root trust member has failed to vote on M consecutive requests, e.g., where M is the maximum blockchain size. If no failure is detected, method 1400 returns to 1402 for further monitoring. Otherwise, method 1400 can proceed from 1408 to 1410, where the root trust membership of the member in question is suspended, e.g., by preventing said member from performing further actions relating to the membership root key. In an implementation in which root trust membership suspension is not enabled, root trust membership can be revoked instead of suspended at 1410, and method 1400 can terminate. By taking a hard line approach with no option for suspension, the revoked root trust member would go back to the end of the line, and would not be reconsidered for the root trust membership group, assuming other members with more longevity exist.

At 1412, in response to being suspended from the root trust membership group at 1410, the suspended member can submit a request to re-join the root trust group. At 1414, method 1400 branches based on whether a timeout T has been enabled for the blockchain group. If a timeout is not enabled, the suspended member can be reinstated to the root trust group at 1416 with a simple majority vote of the root trust membership group, regardless of time passed. This can be done, e.g., to reduce processing resources associated with regenerating the root key and going through the root trust member replacement process.

If, instead, a timeout T is enabled, method 1400 proceeds from 1414 to 1416, in which it is determined whether a request to rejoin the root trust membership group is received from the suspended member, and/or approved by a majority of the remaining members, within the timeout period T. If the timeout period T elapses prior to these events, the root trust membership of the suspended device can be revoked at 1406, e.g., as described above. Otherwise, root trust membership can be reinstated at 1416.

Figure 15:
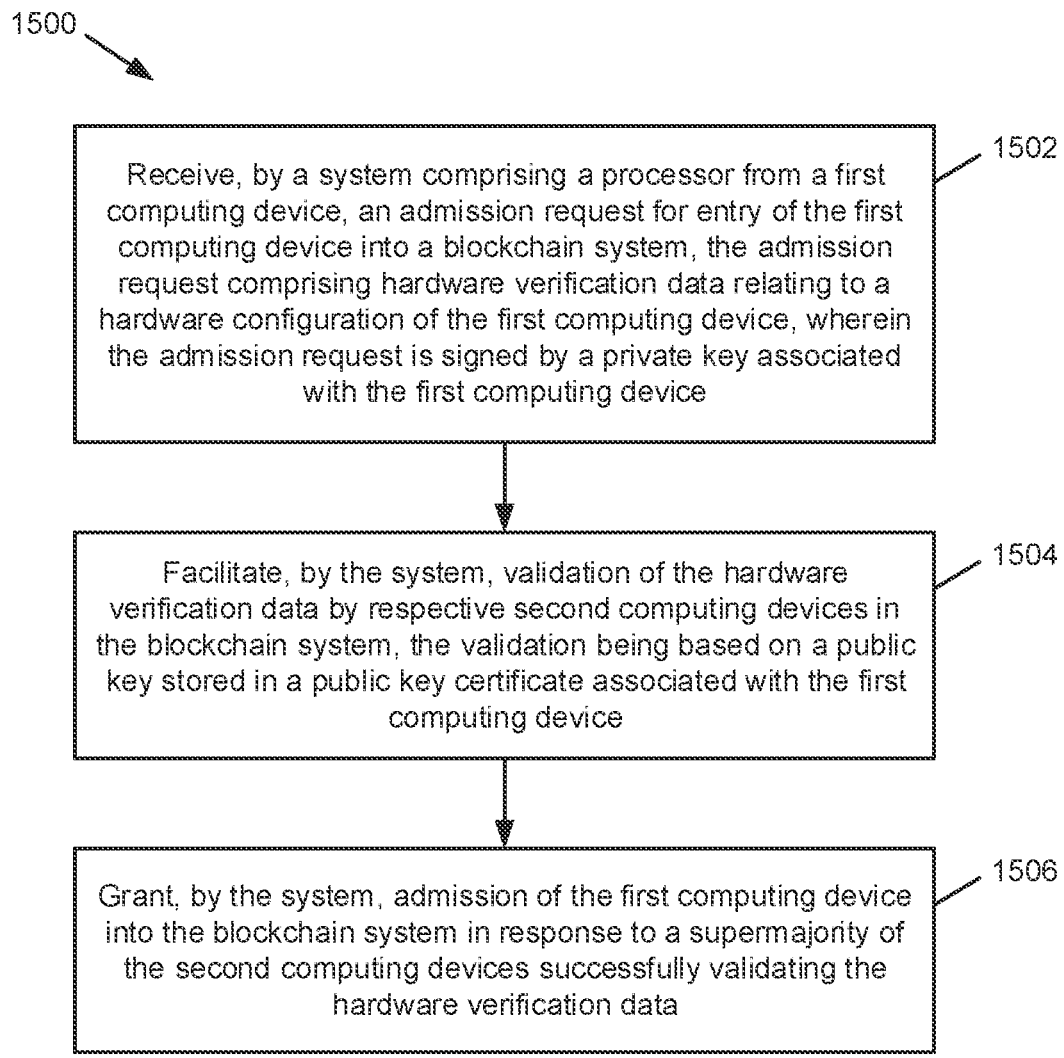
FIG. 15 is a flow diagram of a method that facilitates blockchain security for distributed multi-cloud orchestration and configuration management in accordance with various implementations described herein.

Referring next to FIG. 15, a flow diagram of a method 1500 that facilitates blockchain security for distributed multi-cloud orchestration and configuration management is illustrated. At 1502, a system (e.g., system 100) comprising and/or operatively coupled to a processor can receive (e.g., via a request processing component 110), from a first computing device (e.g., a requesting device 10) an admission request for entry of the first computing device into a blockchain system (e.g., a blockchain group 20). The admission request can include hardware verification data relating to a hardware configuration of the first computing device, and the admission request can be signed by a private key associated with the first computing device.

At 1504, the system can facilitate (e.g., by a hardware validation component 120) validation of the hardware verification data received at 1502 by respective second computing devices (e.g., member devices 30) in the blockchain system. Validation as performed at 1504 can be based on a public key stored in a public key certificate associated with the first computing device.

At 1506, the system can grant (e.g., by a membership management component 130) admission of the first computing device into the blockchain system in response to a supermajority of the second computing devices successfully validating the hardware verification data at 1504.

FIGS. 14-15 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 16:
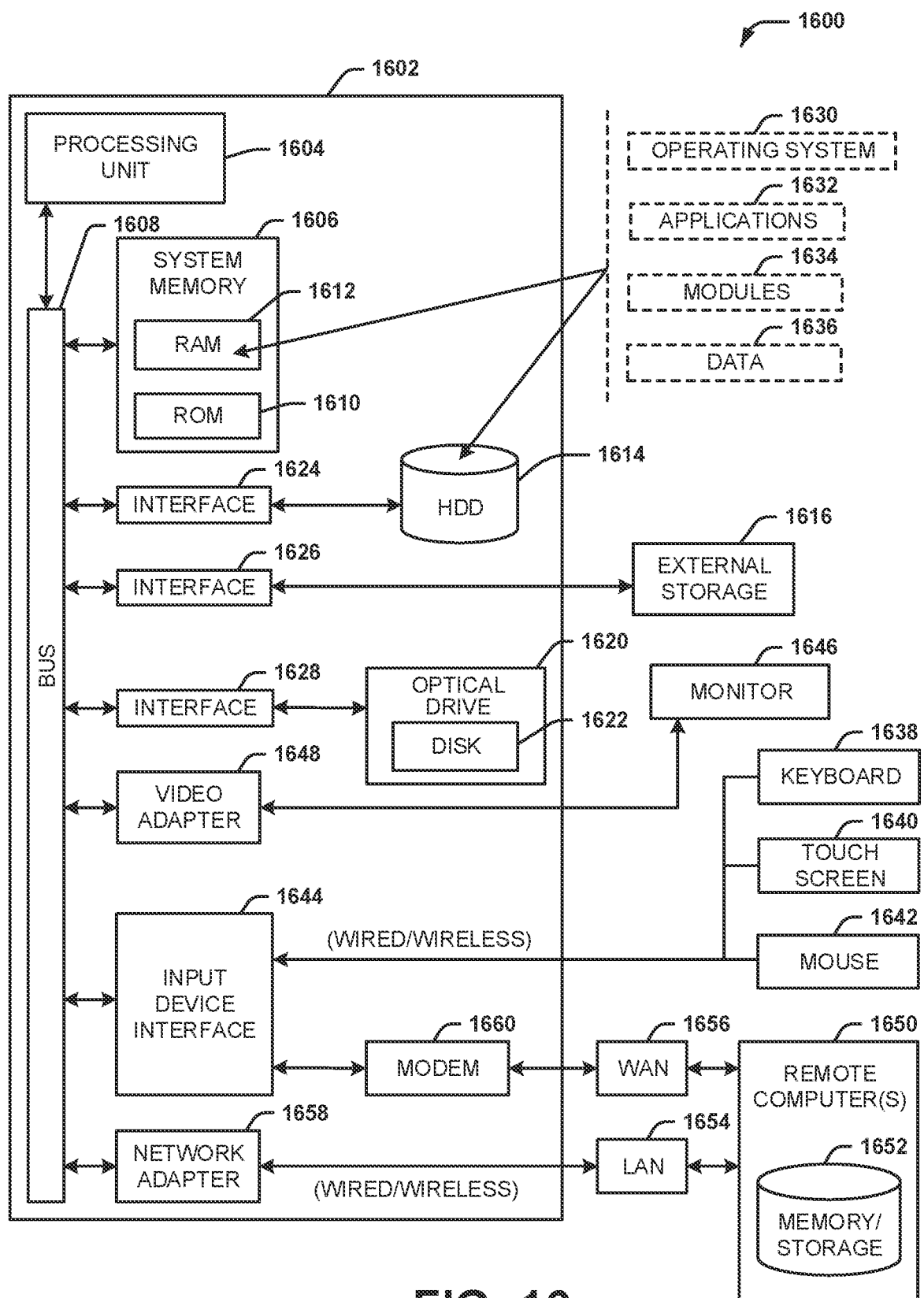
FIG. 16 is a diagram of an example computing environment in which various implementations described herein can function.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD), a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one, or both, of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1694 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are examples and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
at least one memory that stores executable components; and
at least one processor that executes the executable components stored in the at least one memory, wherein the executable components comprise:
a request processing component that receives a request for admission of a device into a blockchain group, associated with the system and comprising member devices, wherein the request comprises hardware attestation data indicative of a hardware configuration of the device, and wherein the request is signed by a device private key associated with the device;
a hardware validation component that facilitates verification, by the member devices of the blockchain group, of the hardware attestation data based on a public key stored in a public key certificate associated with the device;
a membership management component that admits the device into the blockchain group in response to a supermajority of the member devices successfully validating the hardware attestation data;
a blockchain management component that facilitates recording of transactions associated with the blockchain group in respective blocks of a blockchain maintained by the blockchain group, wherein a number of the blocks of the blockchain is bounded by a maximum block count; and
a transaction replication component that removes an oldest transaction, of the transactions recorded in the respective blocks of the blockchain, from the blockchain and replicates the oldest transaction to a distributed database in response to determining that the number of blocks of the blockchain exceeds the maximum block count, wherein the distributed database is not part of the blockchain and is not a distributed ledger.

2. The system of claim 1, wherein the executable components further comprise:
a root key management component that, in response to the device being admitted into the blockchain group, facilitates issuance of a membership root certificate to the device, the membership root certificate being signed by a private root key that is maintained by a root trust subgroup comprising selected devices of the member devices, wherein the selected devices are less than all of the member devices.

3. The system of claim 2, wherein the root key management component selects, as the selected devices of the root trust subgroup, respective ones of the member devices having accurate transaction approval records comprising greater than a threshold number of votes on transaction requests.

4. The system of claim 3, wherein the private root key is a first private root key, and wherein, in response to a selected device of the selected devices leaving the root trust subgroup, the root key management component re-selects the selected devices and replaces the first private root key with a second private root key that is not the first private root key.

5. The system of claim 3, wherein, in response to a selected device of the selected devices has failed to validate a threshold number of consecutive transactions, the root key management component expels the selected device from the root trust group.

6. The system of claim 3, wherein, in response to a selected device of the selected devices failing to validate a threshold number of consecutive transactions, the root key management component prevents the selected device of the selected devices from performing operations related to the private root key pending a membership renewal request, submitted by the selected device, being approved by a majority of other devices of the root trust subgroup other than the selected device.

7. The system of claim 6, wherein the root key management component expels the selected device from the root trust subgroup in response to determining that the selected device has not submitted the membership renewal request within a threshold amount of time following the root key management component preventing the selected device from performing the operations.

8. The system of claim 2, wherein the private root key is different from any device private key associated with any member device of the member devices.

9. The system of claim 1, wherein the executable components further comprise:
a record validation component that monitors respective transaction approval records associated with the member devices; and
a revocation component that removes a member device, of the member devices, from the blockchain group in response to the record validation component determining that the member device has a first transaction approval record, of the transaction approval records, that is inconsistent with respective second transaction approval records of a majority of the member devices.

10. The system of claim 1, wherein the number is a first number, and wherein the executable components further comprise:
a membership suspension component that prevents a member device, of the member devices, from approving new transactions associated with the blockchain group in response to determining that the member device has failed to validate a second number of consecutive transactions, the second number being equal to the maximum block count.

11. The system of claim 10, wherein the membership suspension component re-enables the member device to approve the new transactions associated with the blockchain group in response to a membership renewal request submitted by the member device being approved by a majority of other member devices of the blockchain group other than the member device.

12. The system of claim 1, wherein the transaction replication component, further in response to the determining that the number of blocks of the blockchain exceeds the maximum block count, removes an oldest block, of the respective blocks of the blockchain and containing the oldest transaction, from the blockchain and replicates the oldest transaction to the distributed database by replicating a transaction record corresponding to the oldest transaction to the distributed database without replicating the oldest block to the distributed database.

13. The system of claim 12, wherein the transaction record comprises a device identifier of a device associated with the oldest transaction, a device certificate associated with the device, and a root membership certificate issued to the device.

14. The system of claim 1, wherein the distributed database is a relational database.

15. A method, comprising:
- receiving, by a system comprising at least one processor from a first computing device, an admission request for entry of the first computing device into a blockchain system, the admission request comprising hardware verification data relating to a hardware configuration of the first computing device, wherein the admission request is signed by a private key associated with the first computing device;
- facilitating, by the system, validation of the hardware verification data by respective second computing devices in the blockchain system, the validation being based on a public key stored in a public key certificate associated with the first computing device;
- granting, by the system, admission of the first computing device into the blockchain system in response to a supermajority of the second computing devices successfully validating the hardware verification data;
- facilitating, by the system, recording transactions associated with the blockchain system in respective blocks of a blockchain, the blockchain being bounded by a maximum block count; and
- in response to determining that a number of blocks of the blockchain exceeds the maximum block count:
  - removing, by the system, an oldest transaction, of the transactions recorded in the respective blocks of the blockchain, from the blockchain; and
  - replicating, by the system, the oldest transaction to a distributed database that is not part of the blockchain and not a distributed ledger.

16. The method of claim 15, further comprising:
- in response to the granting of the admission, issuing, by the system, a system root certificate to the first computing device, wherein the system root certificate is signed by a root key that is maintained by a subset of the second computing devices that comprises less than all of the second computing devices.

17. The method of claim 15, further comprising:
- tracking, by the system, transaction approval activity associated with computing devices of the blockchain system; and
- in response to determining that a computing device, of the computing devices, has first transaction approval activity that comprises a defined number of first transaction request votes that are different from second transaction request votes included in second transaction approval activity of a majority of the computing devices, removing, by the system, the computing device from the blockchain system.

18. A non-transitory machine-readable medium comprising computer executable instructions that, when executed by at least one processor, facilitate performance of operations, the operations comprising:
- facilitating verification, by first devices belonging to a blockchain computing group, of hardware configuration data associated with a second device requesting to join the blockchain computing group, wherein the hardware configuration data is provided by the second device in a request, signed by a private key associated with the second device;
- admitting the second device into the blockchain computing group in response to a supermajority of the first devices successfully validating the hardware configuration data;
- recording transaction data, associated with respective management transactions verified by the blockchain computing group, in respective blocks of a blockchain, the blockchain having a defined maximum number of blocks; and
- in response to determining that a number of blocks of the blockchain exceeds the defined maximum number of blocks, removing an oldest management transaction, of the management transactions recorded in the respective blocks of the blockchain, from the blockchain, and replicating the oldest transaction to a distributed database that is not part of the blockchain and not a distributed ledger.

19. The non-transitory machine-readable medium of claim 18, wherein the operations further comprise:
- in response to the admitting, issuing a membership root certificate to the second device, the membership root certificate being signed by a membership root key that is maintained by a subset of the first devices that comprises less than all of the first devices.

20. The non-transitory machine-readable medium of claim 18, wherein the operations further comprise:
- tracking transaction verification records associated with member devices of the blockchain computing group, comprising the first devices and the second device; and
- in response to determining that a first member device, of the member devices, is associated with a defined number of first transaction verification records that are inconsistent with second transaction verification records associated with a majority of second member devices of the member devices, removing the first member device from the blockchain computing group.

* * * * *